Figures 1, 2, 3:
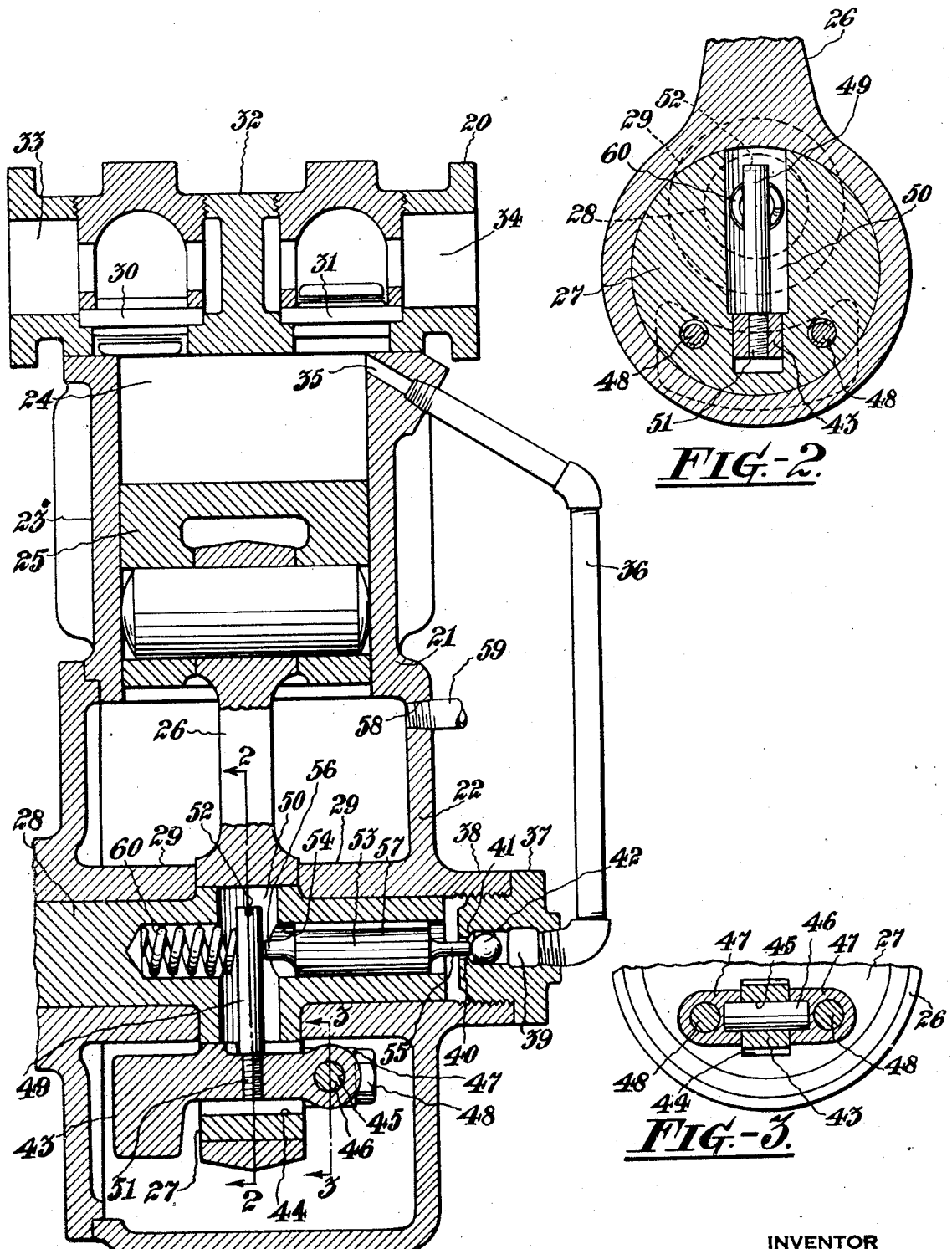

Sept. 14, 1943.  J. LE VALLEY  2,329,401

UNLOADER FOR COMPRESSORS

Filed Oct. 1, 1941

INVENTOR
John LeValley.
BY
HIS ATTORNEY.

Patented Sept. 14, 1943

2,329,401

UNITED STATES PATENT OFFICE 2,329,401

UNLOADER FOR COMPRESSORS

John Le Valley, Painted Post, N. Y., assignor to Ingersoll-Rand Company, New York, N. Y., a corporation of New Jersey Application October 1, 1941, Serial No. 413,138

3 Claims. (Cl. 230—29)

This invention relates to unloaders, and more particularly to an unloader for air compressors.

One object of the invention is to minimize the load on the prime mover of the compressor during the starting period of the compressor.

Other objects will be in part obvious and in part pointed out hereinafter.

In the drawing accompanying this specification and in which similar reference numerals refer to similar parts, Figure 1 is an elevation, partly in section, of a compressor equipped with an unloader constructed in accordance with the practice of the invention, and Figures 2 and 3 are transverse views taken on the lines 2—2 and 3—3, respectively, on Figure 1.

Referring more particularly to the drawing, the compressor, designated in general by 20, comprises a casing 21, the lower portion of which constitutes a crank casing 22 and the upper portion a cylinder 23 that is bored to form a compression chamber 24 containing a piston 25. A rod 26 connects the piston 25 to an eccentric 27 on a shaft 28 rotatable in bearings 29 in the crank casing 22.

The flow of fluid medium to and from the compression chamber 24 is controlled by inlet and discharge valve mechanisms 30 and 31, respectively, arranged in a head 32 seated upon the cylinder 23. The valve mechanisms 30 and 31 are arranged, respectively, in an inlet passage 33 and a discharge passage 34 in the head 32 and act automatically to control the flow of fluid therethrough.

In accordance with the practice of the invention, means are provided for preventing the compression of fluid in the compression chamber 24 and thus the application of a heavy load to the prime mover (not shown) until these devices have attained a certain predetermined speed. The compression chamber 24 is accordingly provided with a vent 35 that opens into a conduit 36 extending from the cylinder to a plug 37 threaded into a boss 38 on the side of the crank casing 22.

The plug 37 is hollow having a passage 39 that communicates with the conduit 36 and extends entirely through the plug. The inner end portion 40 of the passage 39 is constricted, and at the juncture of the constricted portion 40 and the main portion of the passage 39 is a beveled surface 41 to provide a seat for a valve 42, in the form of a ball, that is normally held against the seat 41 by pressure fluid in the passage 39.

The means serving to actuate the valve 42 for raising it from its seat to permit the flow of fluid from the passage 39 are actuated by centrifugal force and comprise a weighted arm 43 and that extends through an opening 44 in the eccentric 27. The weight portion of the arm 43 lies on one side of the eccentric and the other end of the arm lies on the opposite side of the eccentric 27 and has a bore 45 to accommodate a pivot 46 that seats at its ends in bearings 47 secured to the eccentric by bolts 48.

On the intermediate portion of the arm 43 is a rod 49 that extends laterally of the arm into an aperture 50 formed transversely through the shaft 28 and of suitable proportions so that the rod 49 may also oscillate therein in accordance with the movements of the weighted arm 43. One end 51 of the rod is threaded into the arm 43 and in the opposite end of the rod is a slot 52 to accommodate an instrument employed for threading the rod into the arm.

In order to transmit movement from the rod 49 for unseating the valve 42 a transmission member in the form of a plunger 53 is interposed between the rod and the valve and is slidable in a hole 54 in the shaft 28 located coaxial with the valve seat 41 and having portions on the opposite sides of the aperture 50. On the end of the plunger adjacent the plug 37 is a stem 55 of smaller diameter than the restricted portion 40 of the passage 39 through which it extends for engagement with the ball valve 42.

The opposite end 56 of the plunger, which abuts the rod 49, may likewise be of reduced diameter, and in the periphery of the main body portion of the plunger is a groove, or grooves, 57 that extends along the entire length of such body portion to afford communication between the passage 39 and the aperture 50 and thus with the interior of the crank casing 22. Preferably a suitable vent 58 is formed in the wall of the crank casing and said vent may, if desired, be communicated with the inlet opening 33 through a conduit 59.

The force tending to oppose the centrifugal force of the arm 43 is provided by a spring 60 arranged in the innermost portion of the hole 54 to seat at one end against the bottom of said hole and at its other end against the rod 49.

The operation of the device is as follows: Let it be assumed that the compressor is at rest and that the plunger 53 is actuated outwardly by the spring 60 to unseat the ball valve 42. In this position of the parts the compression chamber 24 will be in communication with the interior of the crank casing 22 and thus with the atmosphere, or with the inlet opening 33 in structures equipped with a conduit connecting the crank casing with said inlet opening.

If then the compressor is set in operation, the fluid admitted into the compression chamber through the inlet valve 30 will be exhausted through the vent 35 and the associated channels into the crank casing 22. The compressor will continue to operate in this wise until its speed approaches or reaches normal at which time the centrifugal force acting upon the arm 43 will overcome the force of the spring 60 and rock the rod 49 away from the plunger 53. The pressure fluid thereafter admitted into the passage 39 will move the ball valve 42 to its seat 41 to prevent the further flow of fluid into the crank casing and from this point on the fluid compressed in the compression chamber 24 will be discharged through the valve 31 and the passage 34.

I claim:

1. An unloader, comprising means having a passage, a valve to control the passage, a shaft, a pair of bearings for the shaft, a centrifugally actuated member pivotally connected to the shaft and being located between the bearings, means fixedly secured to the centrifugally actuated member extending into the shaft intermediate the ends of said shaft and oscillating longitudinally of the shaft, and means for transmitting movement from the last mentioned means to the valve.

2. An unloader, comprising means having a passage, a valve to control the passage, a shaft having an eccentric thereon, there being an opening in the eccentric, a centrifugally actuated member extending through the opening and pivotally connected to the eccentric, an arm on the centrifugally actuated member extending transversely through the shaft to oscillate longitudinally of the shaft in accordance with the movement of the centrifugally actuated member, and means for transmitting movement from the arm to the valve.

3. An unloader, comprising means having a passage, a valve to control the passage, a rotary member having a hole therein and an aperture transversely of and opening into the hole, an eccentric on the rotary member in the transverse plane of the aperture, a centifugally actuated member extending through the eccentric and pivotally connected thereto, an arm on the centrifugally actuated member extending into the aperture to oscillate therein in accordance with the movement of the centrifugally actuated member, means in the outer portion of the hole to transmit the movement of the arm to the valve, and a spring in the inner portion of the hole acting against the arm for moving the said means to hold the valve open during the starting movement of the rotary member.

JOHN LE VALLEY.